(12) United States Patent  
Duthie

(10) Patent No.: US 11,148,739 B2  
(45) Date of Patent: Oct. 19, 2021

(54) HOLIDAY TRAILER

(71) Applicant: PIKA TENT TRAILERS INC., Vancouver (CA)

(72) Inventor: Andrew Duthie, North Vancouver (CA)

(73) Assignee: Pika Tent Trailers Inc., Vancouver (CA)

( * ) Notice: Subject to any disclaimer, the term of this patent is extended or adjusted under 35 U.S.C. 154(b) by 292 days.

(21) Appl. No.: 16/352,594

(22) Filed: Mar. 13, 2019

(65) Prior Publication Data

US 2019/0375474 A1 Dec. 12, 2019

Related U.S. Application Data

(60) Provisional application No. 62/682,445, filed on Jun. 8, 2018.

(51) Int. Cl.
| | |
|---|---|
| *B62D 63/08* | (2006.01) |
| *B62D 63/06* | (2006.01) |
| *B60D 1/52* | (2006.01) |
| *B60P 3/34* | (2006.01) |

(52) U.S. Cl.
CPC ............ *B62D 63/08* (2013.01); *B60D 1/52* (2013.01); *B60P 3/341* (2013.01); *B62D 63/062* (2013.01); *B62D 63/061* (2013.01)

(58) Field of Classification Search
CPC .... B62D 63/08; B62D 63/062; B62D 63/061; B60D 1/52; B60P 3/341
See application file for complete search history.

(56) References Cited

U.S. PATENT DOCUMENTS

| | | | |
|---|---|---|---|
| 1,427,365 A | | 8/1922 | Douglas |
| 2,992,037 A | | 7/1961 | Nusbaum |
| 3,284,128 A | * | 11/1966 | Alarie ............... B60P 3/341 |
| | | | 296/173 |
| 3,458,231 A | | 7/1969 | Glass |
| 3,544,152 A | | 12/1970 | Low |
| 4,372,568 A | | 2/1983 | Campbell |
| 4,511,181 A | | 4/1985 | Schantz |
| 4,529,220 A | | 7/1985 | Wright et al. |
| D316,688 S | | 5/1991 | Barginear |
| 5,971,459 A | | 10/1999 | Gauthier |
| 6,017,081 A | * | 1/2000 | Colby ............... B60P 3/341 |
| | | | 296/168 |
| 6,474,714 B1 | | 11/2002 | Stettner |
| 6,511,092 B1 | * | 1/2003 | Chepa ............... B60Q 1/305 |
| | | | 280/408 |

(Continued)

OTHER PUBLICATIONS https://www.youtube.com/watch?v=1ZQ8CCEeTK0, 2018, Nov. 14, 2018.

(Continued)

*Primary Examiner* — Minnah L Seoh  
*Assistant Examiner* — Marlon A Arce  
(74) *Attorney, Agent, or Firm* — Oyen Wiggs Green & Mutala LLP

(57) ABSTRACT

A holiday trailer may comprise a removable stand for rotating the trailer from a horizontal position to a vertical position for storing the trailer. The trailer may house a tent which is extendable in a longitudinal direction away from a body of the trailer. The trailer may comprise a work surface which is removably attached to the trailer.

20 Claims, 16 Drawing Sheets

(56) References Cited

U.S. PATENT DOCUMENTS

| | | |
|---|---|---|
| 7,055,878 B2 | 6/2006 | Imhof |
| 7,458,597 B2 | 12/2008 | MacDougall |
| 7,857,331 B2 * | 12/2010 | Walters, Jr. ............ B62D 61/12 |
| | | 280/86.5 |
| D733,005 S | 6/2015 | Erwin |
| D738,806 S | 9/2015 | Williamson et al. |
| D761,160 S | 7/2016 | Duros et al. |
| D779,380 S | 2/2017 | van den Berg |
| D803,102 S | 11/2017 | Pletcher |
| D822,544 S | 7/2018 | Black et al. |
| 10,081,402 B1 * | 9/2018 | Davis ..................... B60P 1/18 |
| D836,037 S | 12/2018 | Tran |
| D864,032 S | 10/2019 | Bernard |
| D867,216 S | 11/2019 | Van Wyk |
| D867,218 S | 11/2019 | Arter et al. |
| D868,633 S | 12/2019 | Krenelka et al. |
| D872,655 S | 1/2020 | Green |
| 10,611,200 B2 * | 4/2020 | Comeaux ................ B60D 1/54 |
| 2005/0104323 A1 * | 5/2005 | Thurm ................ B62D 63/061 |
| | | 280/491.1 |
| 2006/0279071 A1 * | 12/2006 | Spainhower ......... B62D 63/062 |
| | | 280/656 |
| 2007/0001432 A1 * | 1/2007 | Thurm ................ B62D 63/061 |
| | | 280/656 |
| 2009/0289438 A1 * | 11/2009 | Waddell ............... B62D 63/061 |
| | | 280/401 |
| 2011/0221168 A1 * | 9/2011 | Alexander ........... B62D 63/061 |
| | | 280/639 |
| 2011/0266776 A1 * | 11/2011 | Kapels .................... B60D 1/52 |
| | | 280/656 |
| 2018/0257721 A1 * | 9/2018 | Johnson ............... B62D 63/062 |

OTHER PUBLICATIONS http://leesurelite.com/options.asp, 2018.
http://web.comhem.se/hjlminicampers/EUinfo/optionteu.htm, 2018.

\* cited by examiner

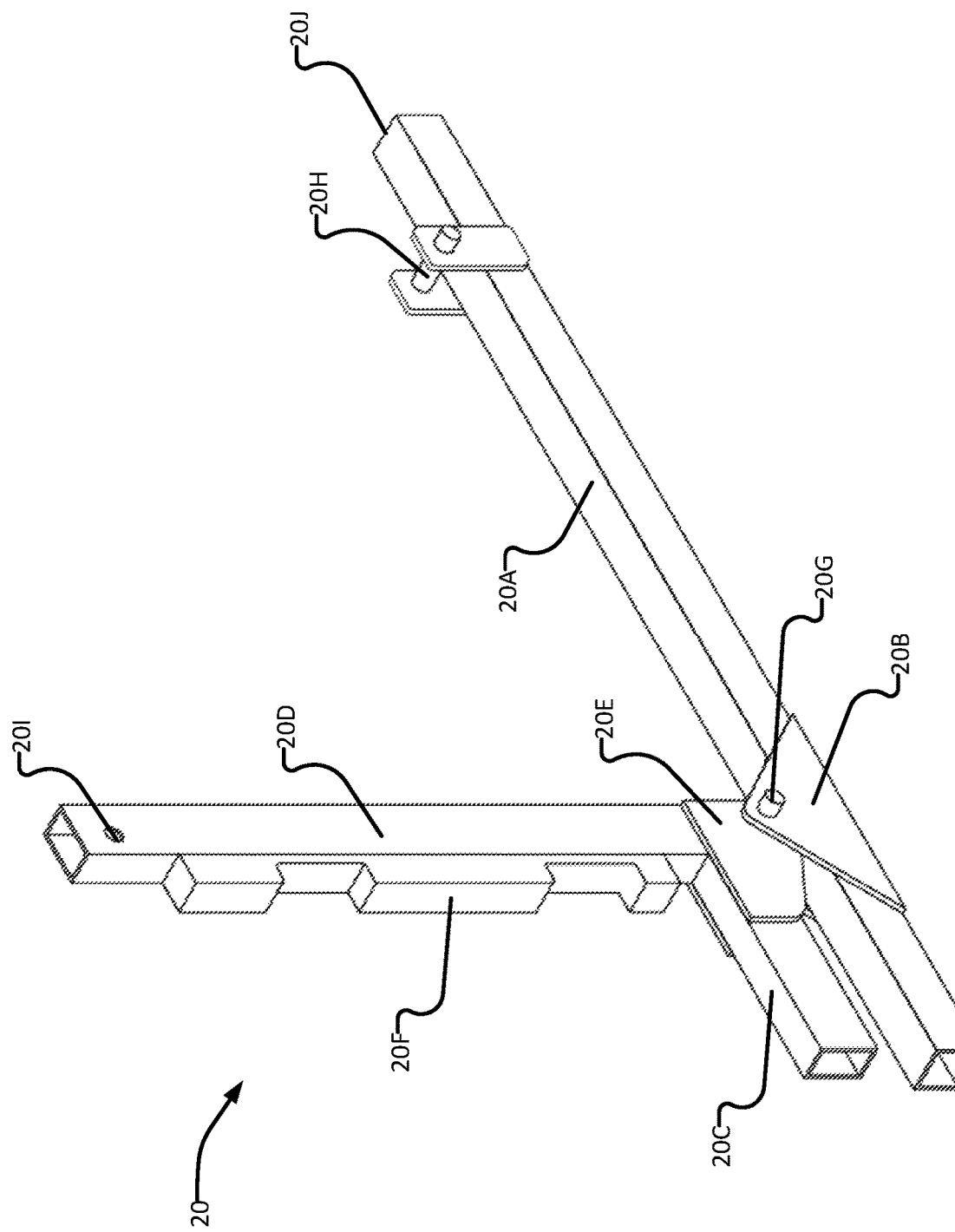

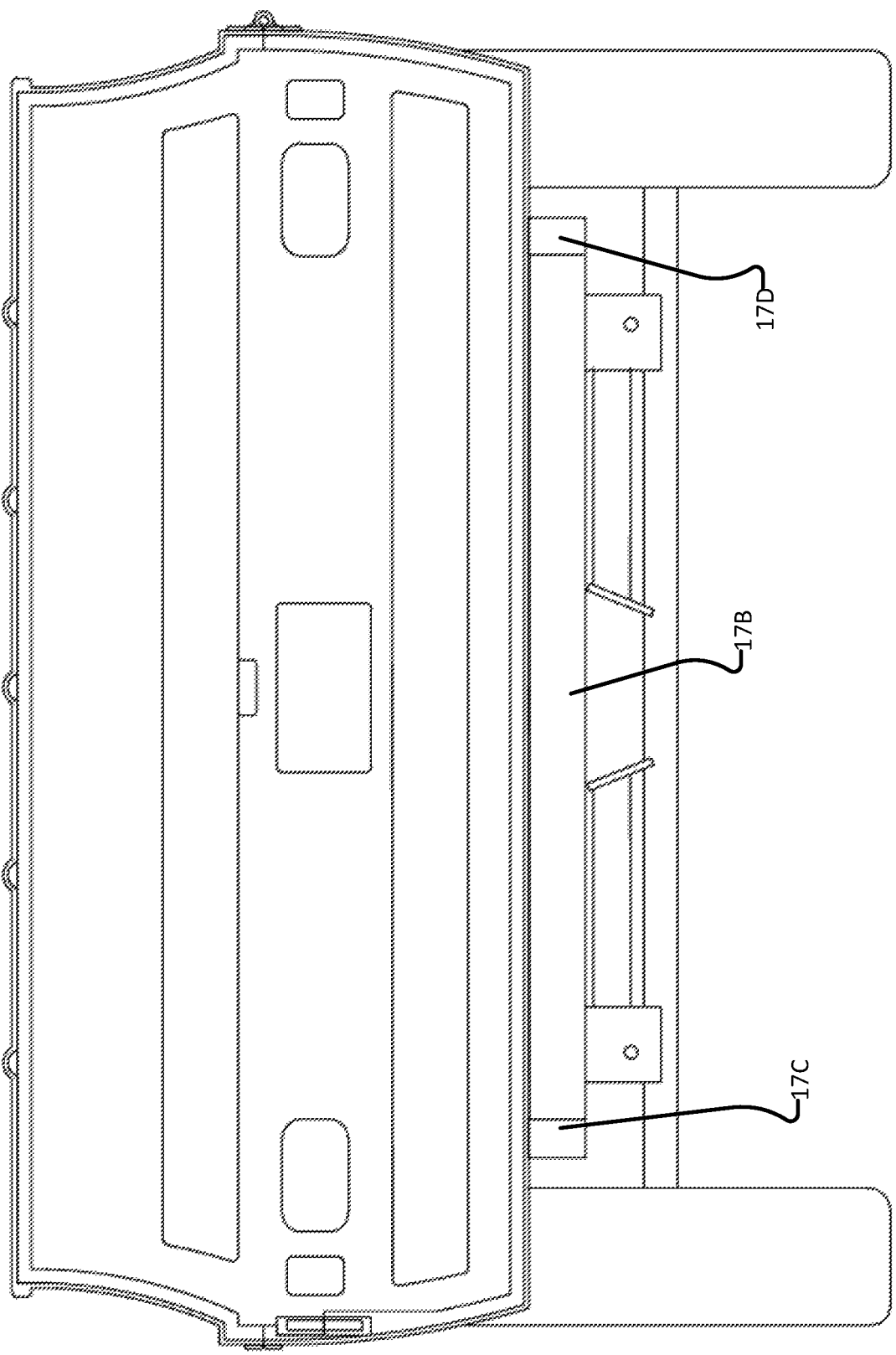

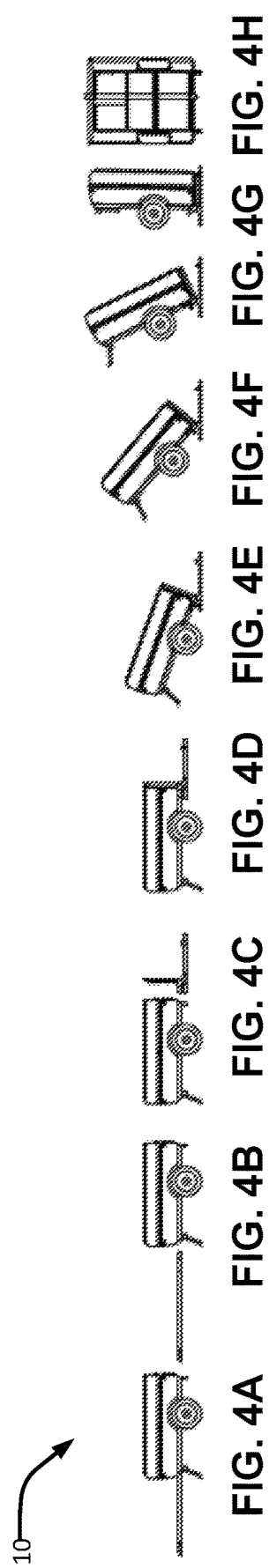

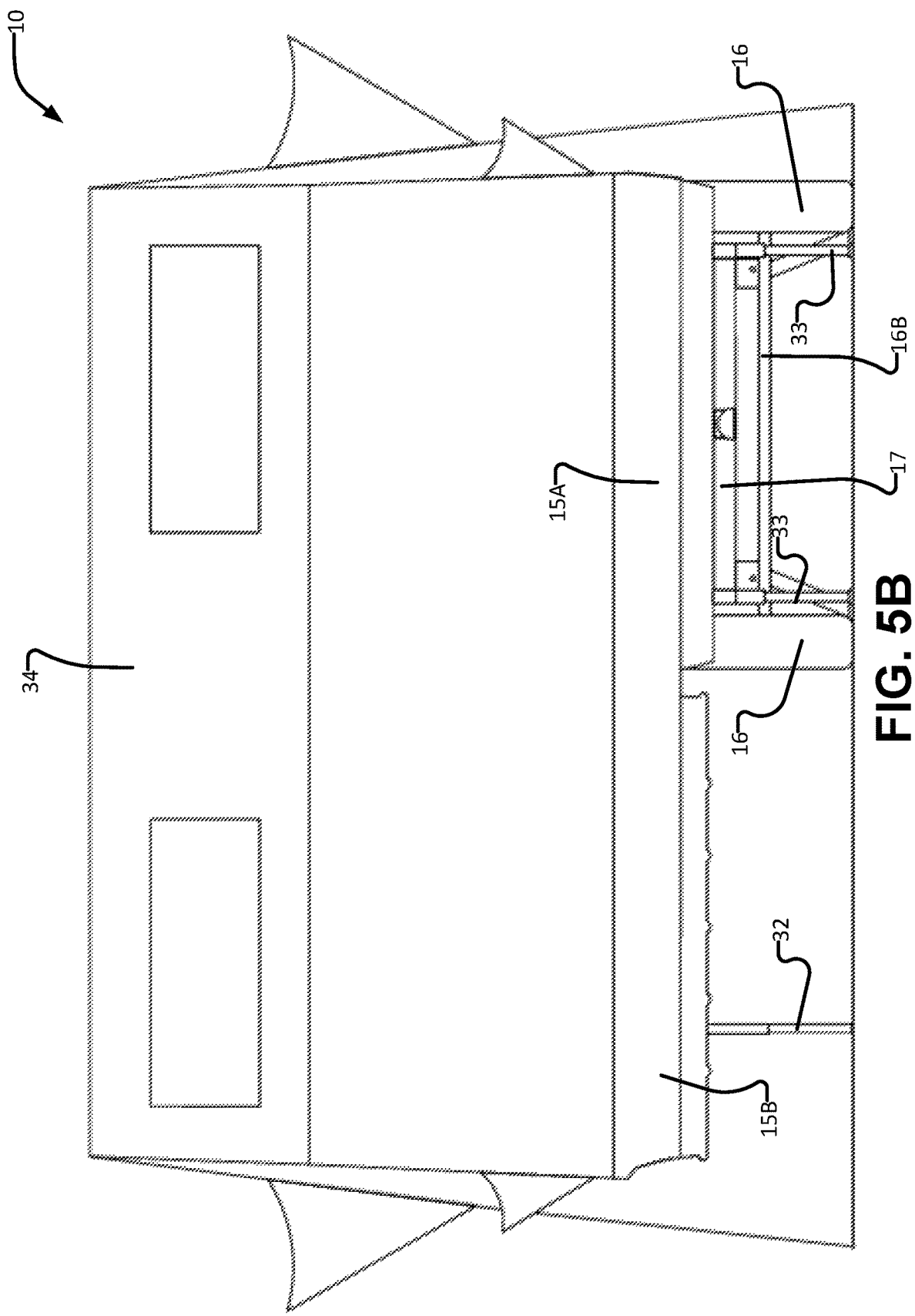

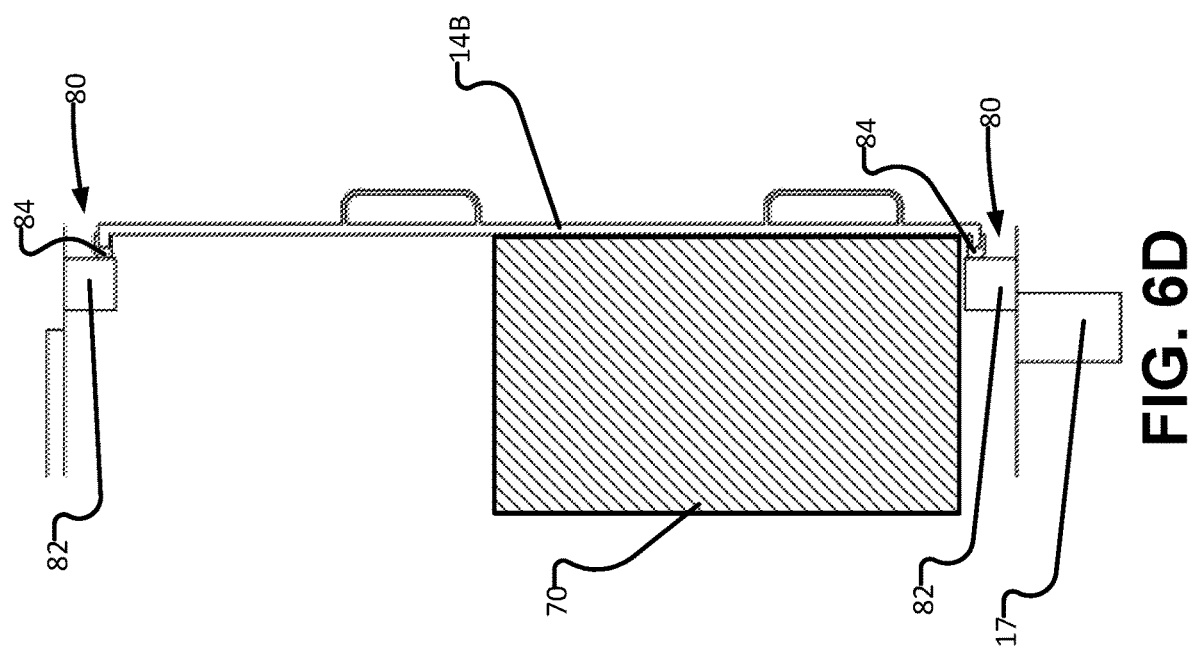

HOLIDAY TRAILER

CROSS-REFERENCE TO RELATED APPLICATIONS

This application claims the benefit under 35 U.S.C. § 119 of U.S. Application No. 62/682,445 filed 8 Jun. 2018 and entitled HOLIDAY TRAILER which is hereby incorporated herein by reference for all purposes.

FIELD

This invention relates to trailers suitable for towing behind vehicles. Some embodiments provide lightweight tent trailers.

BACKGROUND

Camping is a popular pastime. Some people camp in large recreational vehicles that may have several well-appointed rooms. Some people camp in enclosed travel trailers which require a large tow vehicle such as a heavy duty pickup truck. While these vehicles have their places, there is an increasing interest in smaller, lighter, less expensive options. For example, camping trailers that can be safely towed behind compact cars are becoming popular in some circles.

Storage of trailers can be an issue. Many people do not have space to store even a small trailer in its standard horizontal position. Furthermore, small, light trailers may be stolen if left outside.

There remains a need for means of storing trailers in a compact manner.

SUMMARY

This invention has a number of aspects. These aspects may be combined or applied separately. These aspects include, without limitation:
  trailers with adaptations that facilitate storing the trailers in a vertical orientation. Such trailers may, for example, be stored against the wall of a garage or against a wall at an end of a car parking stall;
  trailers with enclosed tents which may be expanded well beyond the normal area of the trailer when the trailer is not being towed; and
  trailers equipped with a removable unit which may, for example, be configured for food preparation.

Further aspects and example embodiments are illustrated in the accompanying drawings and/or described in the following description.

BRIEF DESCRIPTION THE DRAWINGS

The accompanying drawings illustrate non-limiting example embodiments of the invention.

FIG. 3B is an isometric view of the stand shown in FIG. 3A.

FIG. 3D is a rear elevation view of the trailer shown in FIG. 1.

FIGS. 4A-4H are side elevation views of the trailer shown in FIG. 3 being moved from a horizontal configuration to a vertical storage configuration.

FIG. 5B is a front elevation view of the trailer with attached tent shown in FIG. 5A.

FIG. 6D is a vertical cross-sectional view of a seal around the work surface within the trailer shown in FIG. 6A.

DETAILED DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive, sense.

Figure 1:
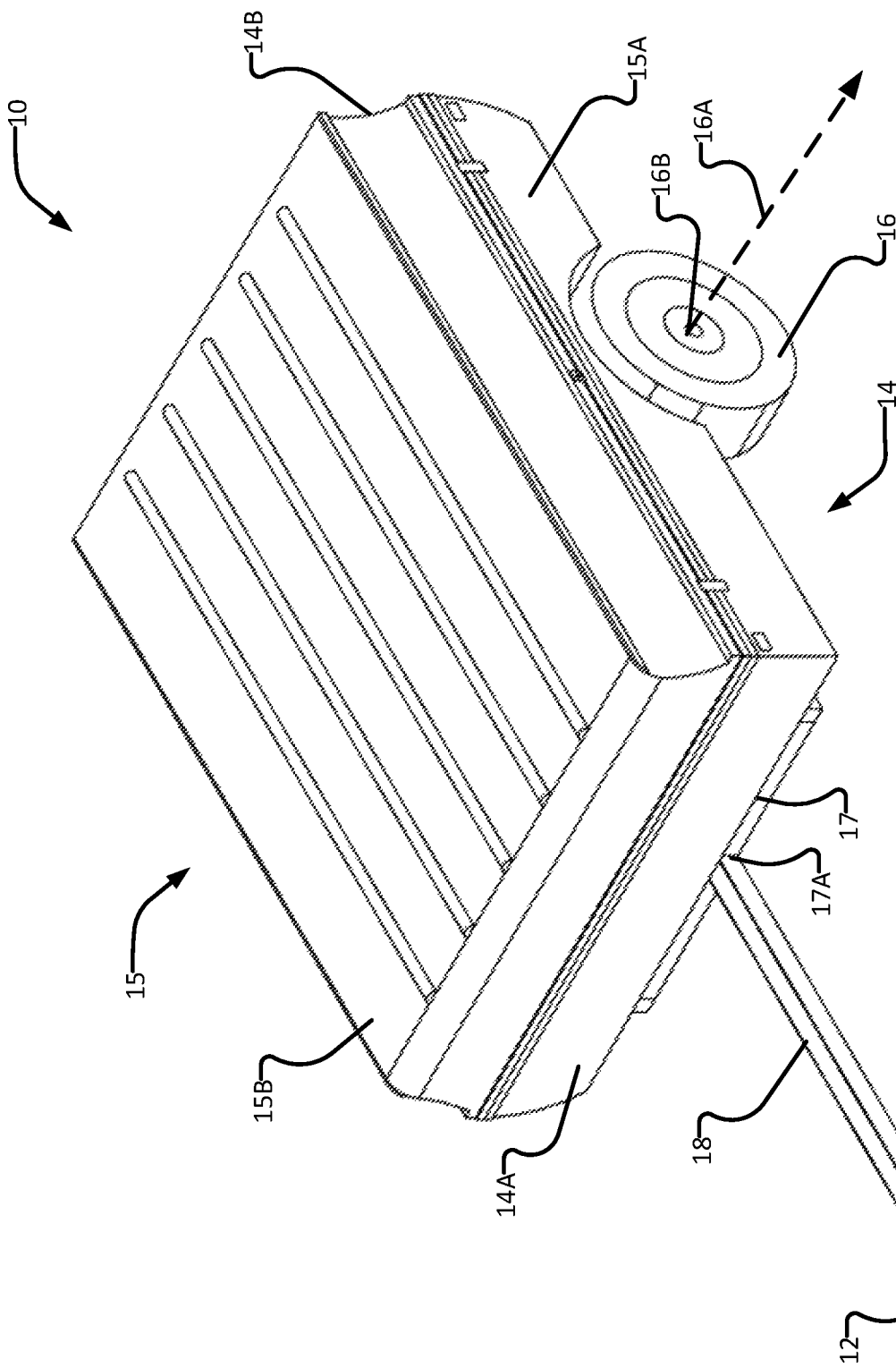
FIG. 1 is an isometric view of a trailer according to an example embodiment of the invention.

FIG. 1 shows a trailer 10 according to an example embodiment of the invention. Trailer 10 has a hitch 12 for coupling to a tow vehicle. Trailer 10 may be lightweight so that it can be safely towed even behind a car with a towing capacity of 1000 pounds (500 kilograms) or less. For example, trailer 10 may have a weight between 500 pounds (250 kilograms) and 1000 pounds (500 kilograms).

Trailer 10 has a low profile so that it does not obstruct rearward view from the tow vehicle. The low profile may also reduce wind drag when trailer 10 is being towed. As described below, the low profile also facilitates compact storage of trailer 10. In some embodiments, trailer 10 has a height of less than about 4 feet (~1.2 metres). In some embodiments, trailer 10 has a width of approximately 5.5 feet (~1.7 metres).

In the illustrated embodiment, trailer 10 comprises a body 14 having a front end 14A and a rear end 14B. Trailer body 14 includes a shell 15 having a bottom part 15A and a top part 15B. Top part 15B may be opened to access the inside of shell 15. For example, top part 15B may be hinged to bottom part 15A, forming a clamshell arrangement as described in more detail below. Top part 15B may be locked to bottom part 15A by any suitable means (e.g. cam-type latch or the like) when the clamshell is closed. Shell 15 may be formed from a durable waterproof material such as a formed plastic, aluminum, or fiberglass, for example.

Trailer 10 includes wheels 16 mounted for rotation about an axis 16A. Even though trailer 10 may be much smaller and lighter than conventional travel trailers, it is necessary for the distance from hitch 12 to axis 16A to be long enough for trailer 10 to smoothly trail behind a tow vehicle. For example, the distance from hitch 12 to axis 16A may be such that the body 14 of trailer 10 does not contact the tow vehicle when the tow vehicle makes a 90° turn. It is also desirable for this distance to be long enough to facilitate control of the steering of trailer 10 when backing up the tow vehicle. Tongue 18 may, for example, project from front end 14A of body 14 by a distance in the range of about 3 to 6 feet (~1 to 2 metres).

Wheels 16 may be supported in various ways. In the embodiment shown in FIG. 2, wheels 16 are rotatably mounted at either end of an axle 16B that is coupled to a frame 17 which supports shell 15. Axle 16B may be coupled to frame 17 by a suspension which may, for example, comprise springs and/or shock absorbers. Frame 17 may optionally be integrated with shell 15.

Storage

Trailer 10 has a number of features to facilitate storage. These include:

- As shown in FIG. 1, hitch 12 is mounted to a tongue 18 that is removable from the rest of trailer 10. Removing tongue 18 makes trailer 10 shorter.
- Trailer 10 comprises a stand that is optionally removable. The stand is configured to hold the body of trailer 10 in a generally vertical orientation. The stand may be configured to facilitate moving body 14 of trailer 10 into the generally vertical orientation.
- The center of gravity of trailer 10 is located so that trailer 10 is stable on its stand when stored vertically.
- The length of trailer 10 (not including tongue 18) is short enough to allow trailer 10 to be stored in the generally vertically orientation in a structure having a given ceiling height. In some cases, body 14 of trailer 10 is dimensioned to allow trailer 10 to be moved into the generally vertical orientation while trailer 10 is inside a structure having a ceiling height of 8 feet.

Figure 2:
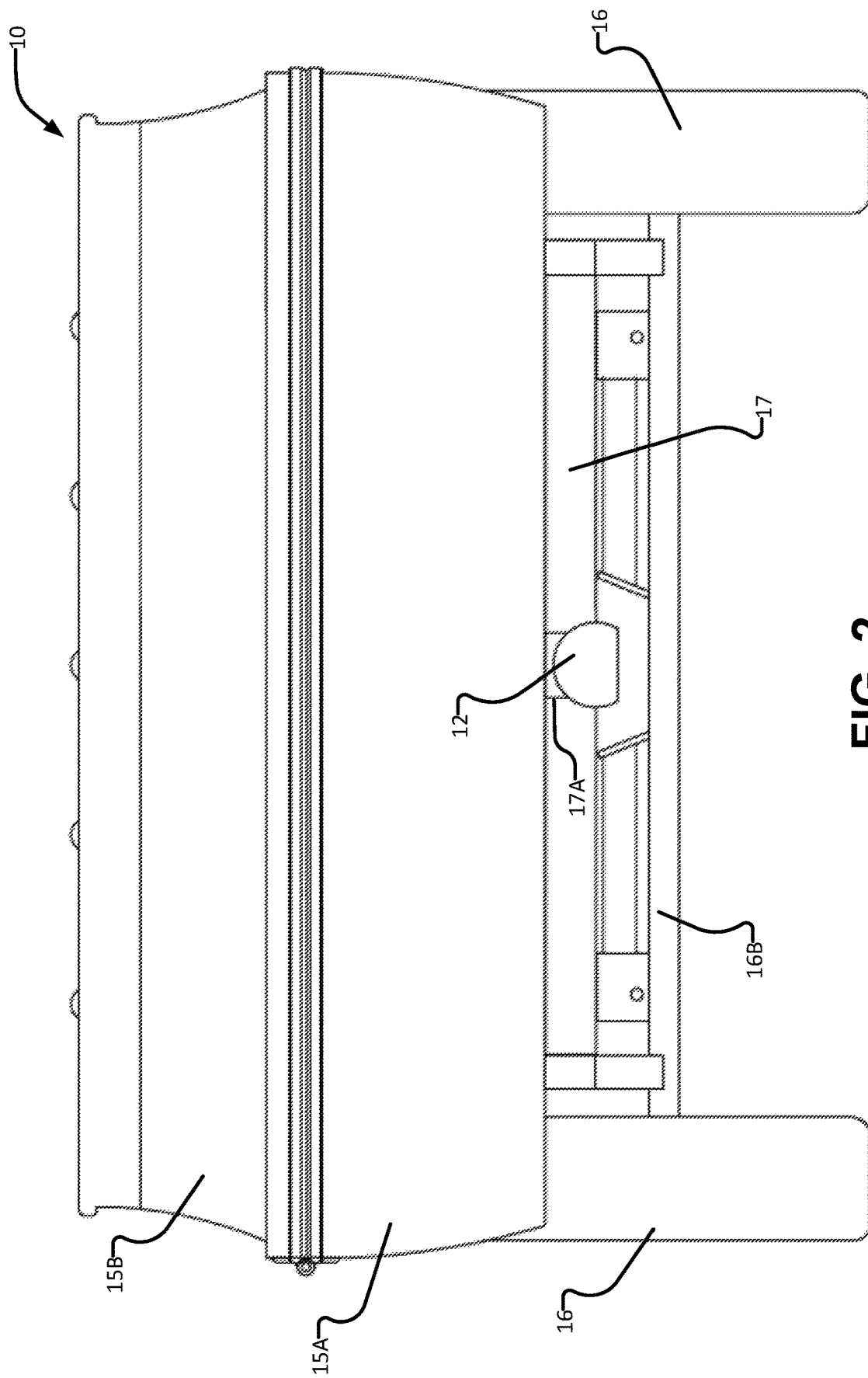
FIG. 2 is a front elevation view of the trailer shown in FIG. 1.

Tongue 18 may, for example, comprise a section of tubing that is received in a socket 17A in frame 17, as shown in FIG. 2. When trailer 10 is set up for being towed, tongue 18 may be retained in socket 17 by suitable fasteners such as removable or retractable pins, bolts, cams, or the like.

With tongue 18 removed, body 14 of trailer 10 may have a length that is less than 7.5 feet (~2.15 metres) long. This allows body 14 to be stood vertically in a garage or other storage area having a ceiling having a height of 8 feet or more. Wiring (e.g. to the tail lights of trailer 10) may be clipped to tongue 18, and unclipped from tongue 18 when tongue 18 is removed. Some embodiments provide a wiring connector on body 14 that allows wiring for connection to a tow vehicle to be uncoupled from body 14 when it is desired to remove tongue 18.

Figure 3A:
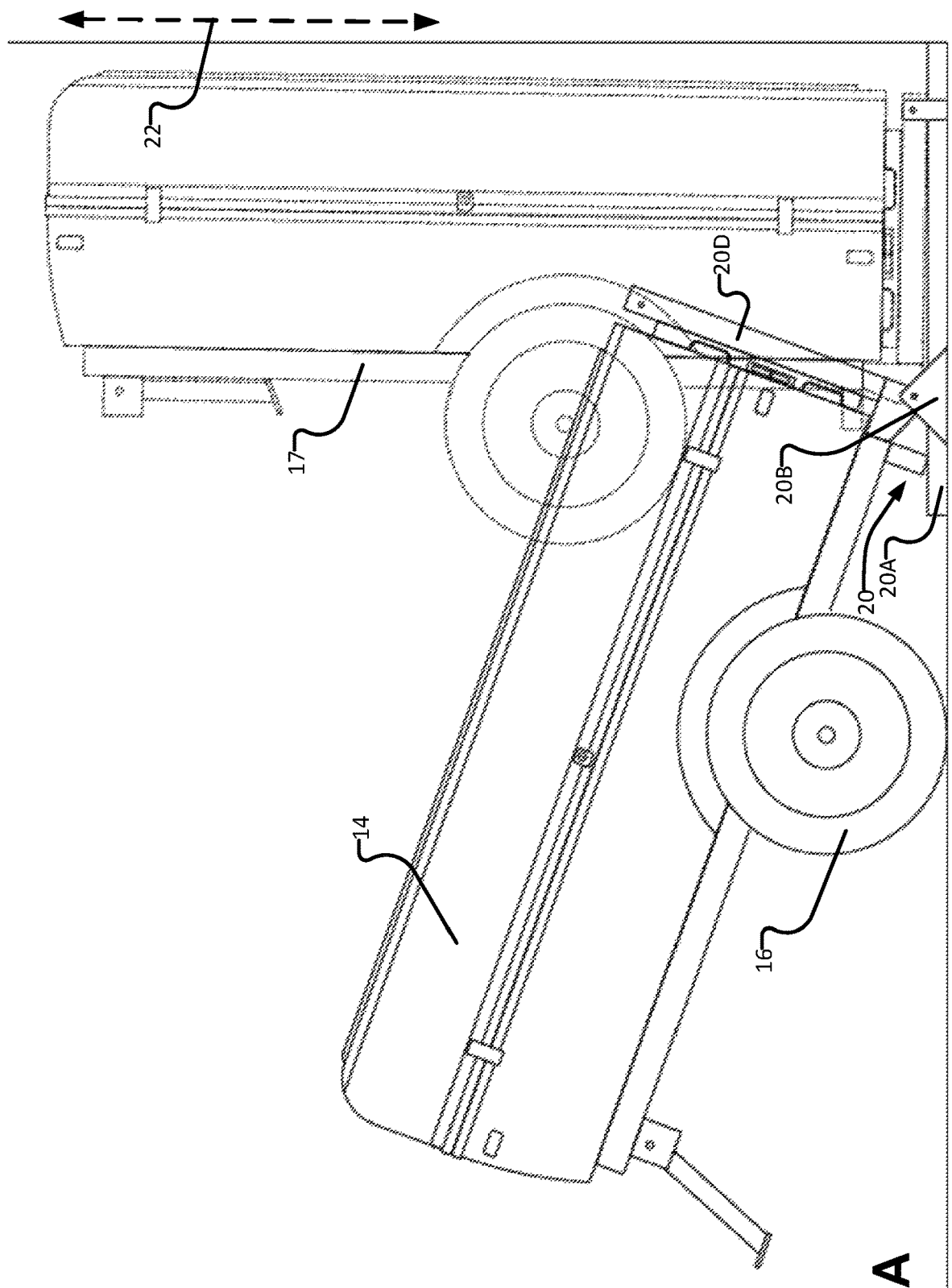
FIG. 3A is a side elevation view of a trailer standing vertically with the use of a stand, according to an example embodiment of the invention.

As shown in FIG. 3A, a stand 20 may be provided at one end of body 14. In the example embodiment shown in FIG. 3A, stand 20 comprises a first part 20A and a second part 20C (not shown in FIG. 3A) connected to a third part 20D to form a generally L-shape. First part 20A is configured to rest on the ground when trailer 10 is being stored in the vertical orientation. Second part 20C is detachably couplable to trailer 10; that is, stand 20 is preferably removable from trailer 10 for travel. First and second parts 20A, 20C are pivotally connected to one another. In the illustrated embodiment, the coupling is provided by a hinge 20B. In this way, part 20C may be coupled to trailer 10 when trailer 10 is in a horizontal position. To move trailer 10 into a vertical storage configuration, trailer 10 may be pivoted about hinge 20B relative to part 20A until part 20C and trailer 10 are in a generally vertical position.

In some embodiments, the pivot point provided by hinge 20B is raised above part 20A, such that trailer 10 is tilted slightly backward (i.e. to the right in FIG. 3A) when in the generally vertical position. That is, part 20C may pivot slightly more than 90°, from horizontal to slightly past vertical as trailer 10 is moved to its vertical storage position. In some embodiments, part 20C may pivot until it is 2-5° past vertical (again, to the right in FIG. 3A). Advantageously, a centre of gravity of trailer 10 may be first raised and then lowered as trailer 10 is tilted into its vertical storage configuration.

Stand 20 may include a stop that prevents trailer 10 from tipping past its vertical storage configuration. In the illustrated embodiment, contact between parts 20A and 20D acts to provide a stop.

In some embodiments, the length of the portion of first part 20A between hinge 20B and end 20J is selected such that end 20J can be placed against the base of a wall and then trailer 10 can be tipped up to its vertical storage position. First part 20A spaces hinge 20B far enough from the wall to permit trailer 10 to be moved to the vertical storage position while leaving trailer 10 close enough to the wall that space is not wasted. In some embodiments, first part 20A spaces the part of body 14 that is closest to the wall when trailer 10 is in the vertical storage position (i.e. top part 15B) about 6 inches (~15 centimetres) or less away from the wall.

In some embodiments, two stands 20 may be provided, one on each side (i.e. left and right sides) of body 14. By providing two stands 20 which are the same length, abutting end 20J of each stand against a wall may ensure that trailer 10 is parallel to the wall when it is in the vertical storage position, again maximizing the available space.

Figure 3C:
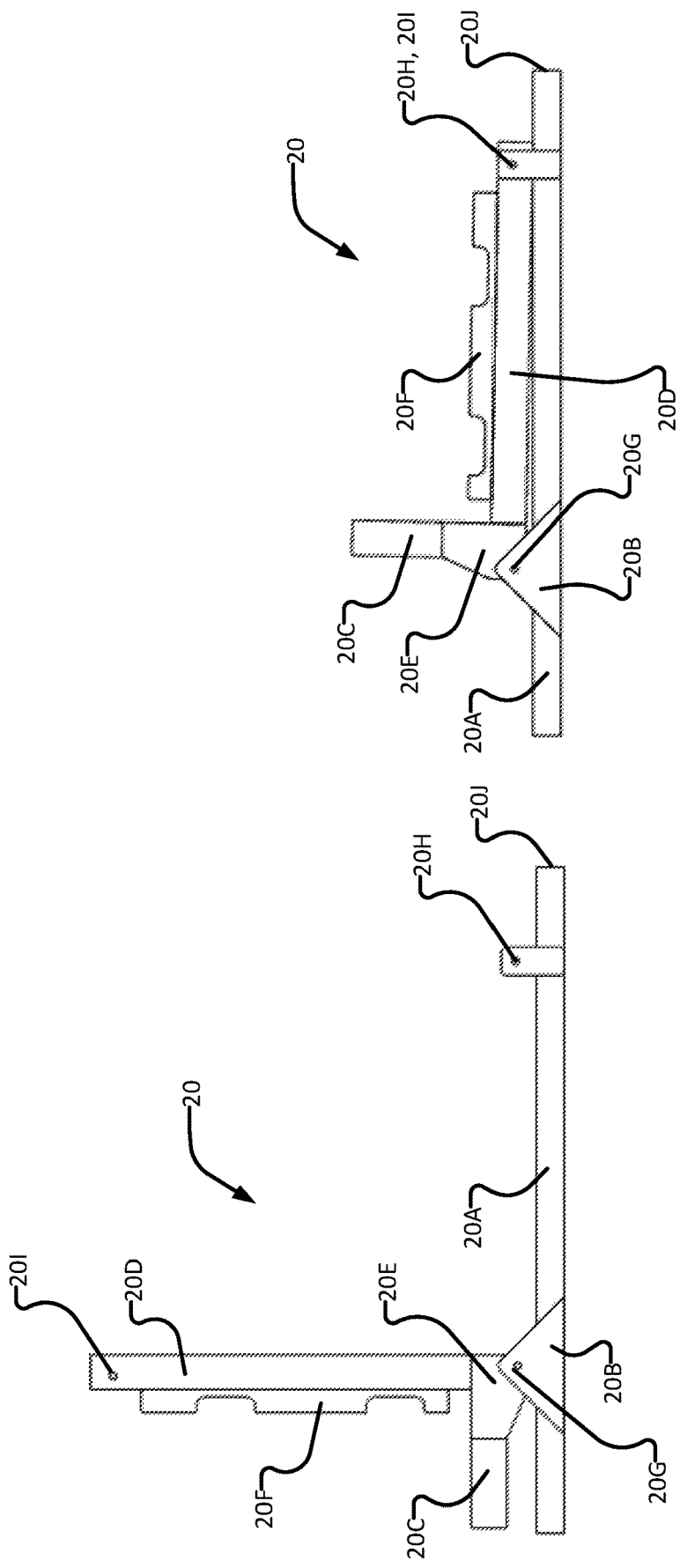
FIG. 3C is a side elevation view of the stand shown in FIG. 3A, in its unlocked and locked positions.

In the example embodiment shown in FIGS. 3B and 3C, stand 20 comprises base members 20A and 20B, and members 20C and 20D that are hinged to base member 20A by members 20B, 20E, and 20G. Stand 20 is coupled to frame 17 by member 20C. For example, member 20C may fit into corresponding sockets 17C and 17D in frame 17 (as shown in FIG. 3D). In some embodiments, suitable fasteners may be provided to retain member 20C in sockets 17C and 17D. The weight of trailer 10 may maintain the coupling between member 20C and sockets 17C, 17D when trailer 10 is in the vertical storage position.

Stand 20 may comprise one or more parts. In a convenient implementation shown in FIG. 3B, stand 20 comprises an L-shaped part (formed by members 20C, 20D) that is hinged at its elbow (i.e. member 20E) to longitudinal base member 20A by plates (members 20B, 20E) attached to the L-shaped part and base member 20A and held in place by a rod (member 20G). In this way, the L-shaped part is pivotally connected to base member 20A. In this implementation, members 20A, 20C, and 20D may be formed, for example, by bending a square or rectangular tube, or by welding together sections of square or rectangular material.

Rear end 14B of trailer 10 rests on member 20F which is attached to member 20D when trailer 10 is stored vertically with tongue 18 removed. Member 20F may be made of a soft material to cradle rear end 14B.

Member 20A (and in particular, end 20J of member 20A as shown in FIGS. 3B and 3C) may abut a wall before trailer 10 is moved from the horizontal position to the vertical storage position. Member 20A may be sized to ensure the correct spacing from a wall when trailer 10 is stored. For example, as shown in FIG. 3C, member 20A may be slightly longer than member 20D (which may have a length approximately equal to the height of trailer 10), such that there is a small space between trailer 10 and the wall when trailer 10 is in the vertical storage position. For example, member 20A may be sized such that the space between trailer 10 and the wall may be less than one foot, or less than six inches, or less than one inch.

As can be seen in FIG. 3A, member 20D is angled slightly downward (i.e. to the right in FIG. 3A) when trailer 10 is in the vertical storage position. This is facilitated by allowing part 20C to pivot by slightly more than 90°, as discussed above. This configuration assists in preventing trailer 10 from tipping back down to its horizontal position. That is, the centre of gravity of trailer 10 is lower than its maximum height (reached when member 20C is exactly vertical) when trailer 10 is in the vertical storage position. In some embodiments, a pin 20H is configured to extend into an aperture 201 in member 20D when trailer 10 is in the vertical storage position, to assist in preventing trailer 10 from tipping back to the horizontal position.

When stand 20 is attached to sockets 17C and 17D in the rear end 17B of frame 17, member 20D extends generally at right angles to a longitudinal axis 22 of trailer body 14, as shown in FIG. 3A. Axis 22 is generally horizontal when trailer 10 is being towed.

FIGS. 4A through 4H show trailer 10 being moved from a horizontal position to a vertical storage configuration. In FIGS. 4A-4D, tongue 18 is removed from socket 17A of frame 17 and one or more stands 20 are attached to sockets 17C, 17D in the rear end 17B of frame 17. In FIG. 4D, trailer body 14 with stand 20 attached is backed up to a wall so that end 20J of base member 20A of stand 20 is against the wall. In FIGS. 4E-4G, trailer body 14 is tilted to bring base member 20A into contact with the ground and then trailer body 14 is lifted toward a vertical orientation using the fulcrum provided by members 20B, 20E, and 20G. In FIG. 4H, trailer body 14 is standing on rear end 14B, supported by stand 20.

The stability of trailer 10 when it is being stored vertically as shown in FIG. 4H can be increased by raising the height of member 20G relative to base member 20A so that the resting angle of member 20C is further over from the vertical toward the final storage position (i.e. the slope of member 20D relative to the ground is larger). The location of the work surface of trailer 10, as described below, in the back of shell 15 will further weigh down trailer 10 when in the vertical storage position.

Figure 4I:
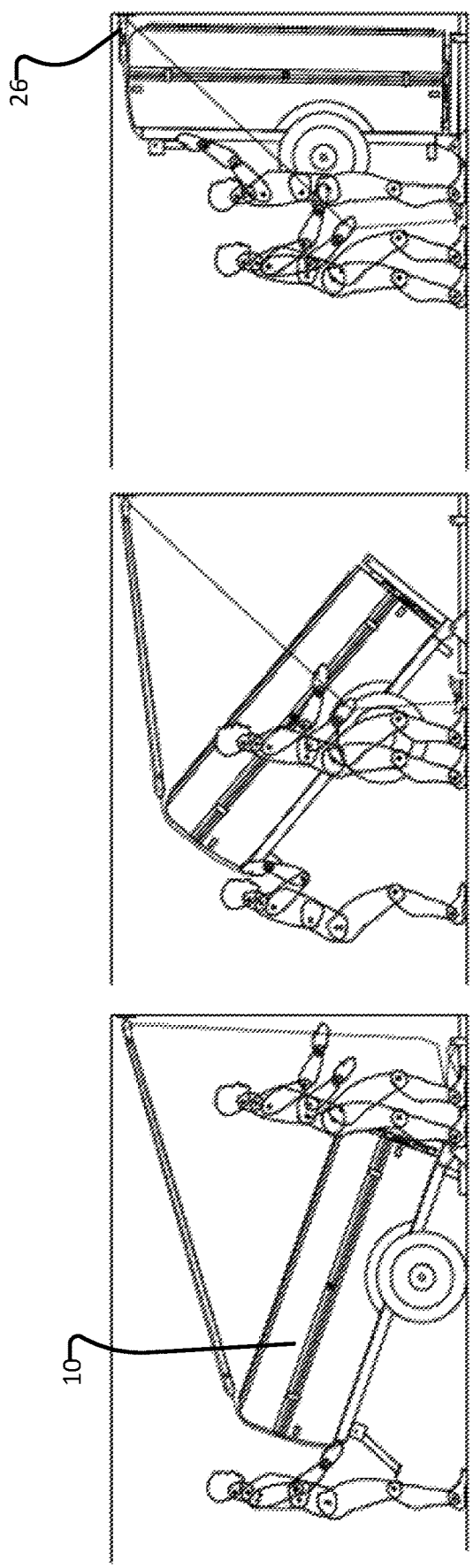
FIG. 4I is a side elevation view of the trailer shown in FIG. 3 being moved from a horizontal configuration to a vertical storage configuration by manual lifting and/or by using pulleys.

Trailer body 14 may be light enough that one or two reasonably fit people can safely lift trailer body 14 into the vertical storage position shown in FIG. 4H. A user may optionally use one or more lifting aids such as, for example, pulleys 26 attached to a structure, a winch, a puller, or the like, to help lift trailer body 14 to a vertical position, as shown in FIG. 4I. Pulleys 26 may optionally be arranged to provide a mechanical advantage. In some embodiments, a 4:1 pulley system is used. A cam may be provided to lock the ropes of pulleys 26 into place once trailer 10 is stored. Straps may be provided to hold trailer 10 in place for added safety.

While significant variations in the design, features, and layout of trailer 10 are possible, it can be appreciated that a trailer 10 having general design features as described herein is well-adapted for use by urban people who have small cars and limited storage space. Such a trailer may be stored at the end of a parking space in a carport or garage while leaving room to park a car.

When it is desired to use trailer 10, it is relatively quick and easy to reverse the steps shown in FIGS. 4A to 4H.

Figure 7A:
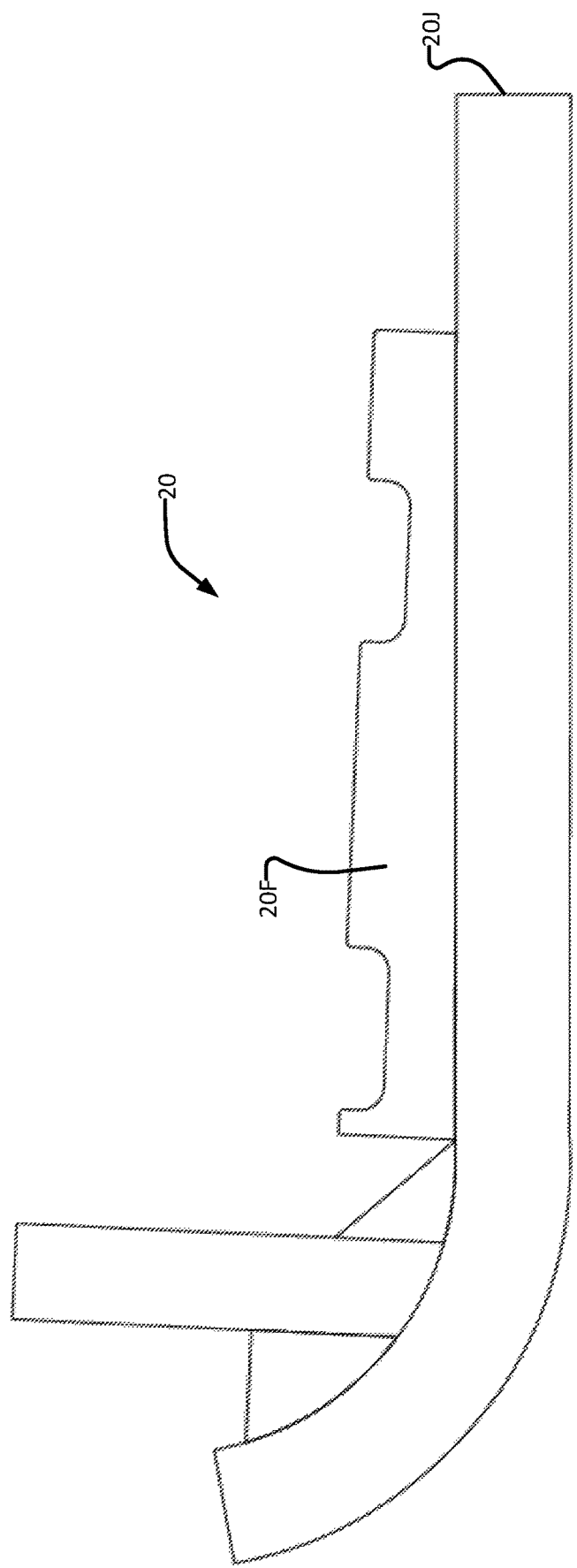
FIG. 7A is a side elevation view of a stand for use with a trailer, according to an example embodiment of the invention.
Figure 7B:
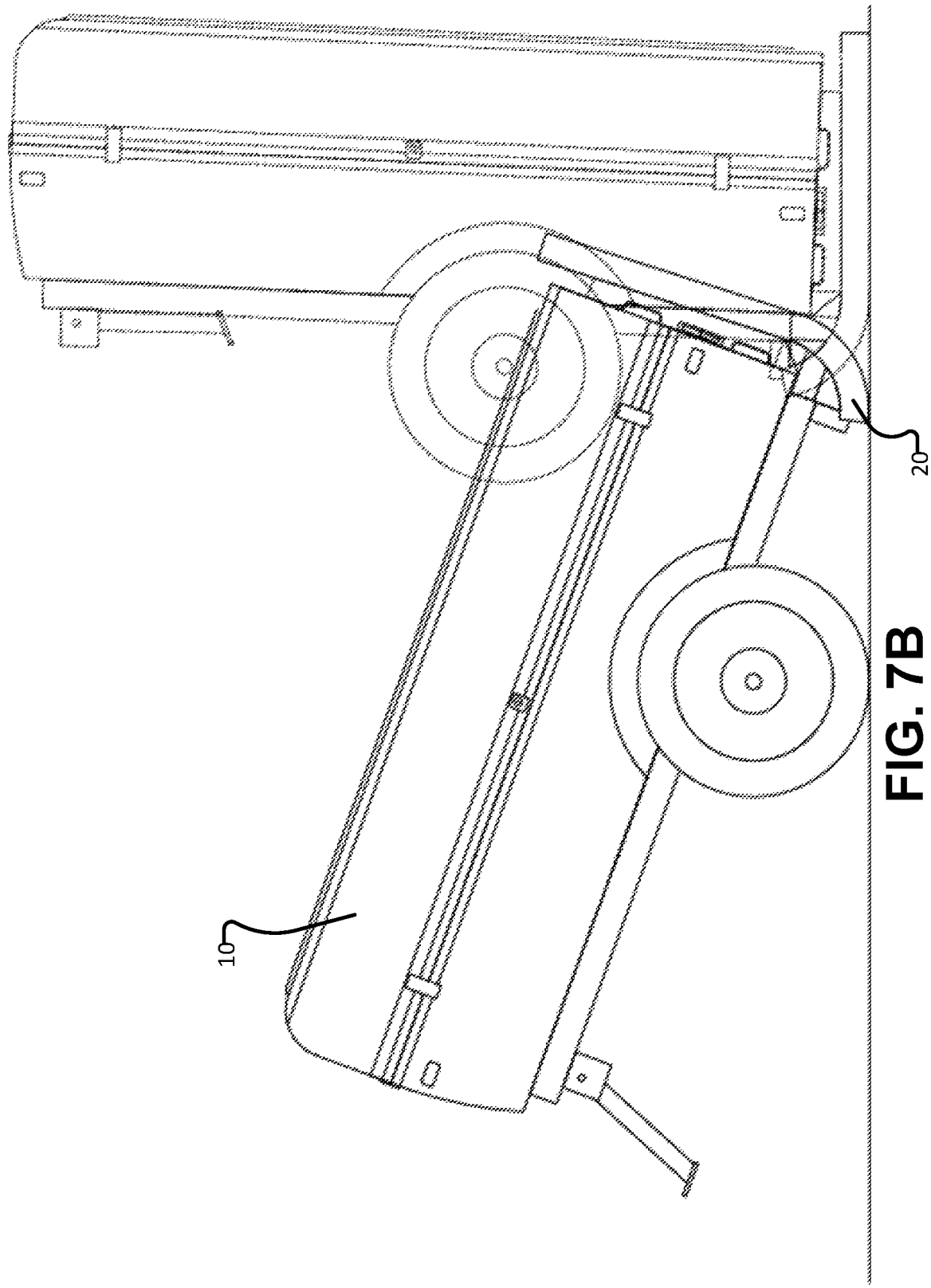
FIG. 7B is a side elevation view of a trailer being moved from a horizontal position to a vertical storage position using the stand shown in FIG. 7A.

In some alternative embodiments, stand 20 comprises an L-shaped member which preferably has a curved corner, as shown in FIG. 7A. Trailer 10 may be moved from the horizontal position to the vertical storage position by lifting trailer 10 so that the curved corner rolls and serves as a fulcrum about which body 14 of trailer 10 pivots into the vertical storage position, as shown in FIG. 7B. In some embodiments of the configuration shown in FIGS. 7A and 7B, stand 20 may have a length which is long enough to ensure sufficient spacing between trailer 10 and a wall, as described above. In the illustrated embodiment, member 20F is angled slightly downward (i.e. to the right of FIG. 7A) in order to prevent trailer 10 from tipping back to the horizontal position from the vertical storage position.

Tent

Figure 5A:
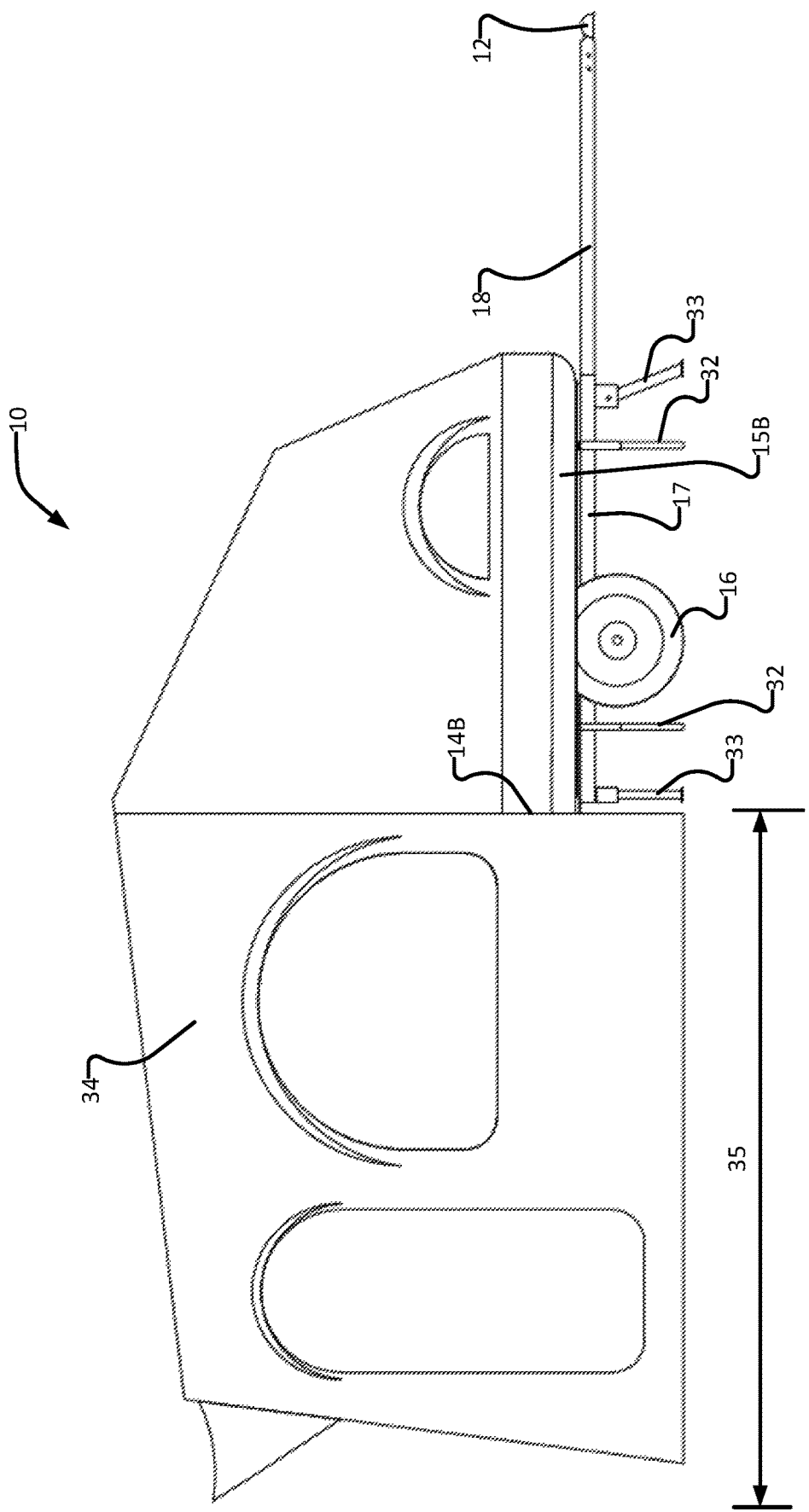
FIG. 5A is a side elevation view of a trailer with an attached tent, according to an example embodiment of the invention.

FIGS. 5A and 5B show a trailer 10 configured as a tent trailer. In this example implementation, top part 15B of shell 15 is hinged along one side to bottom part 15A such that, when opened, shell 15 provides a platform approximately twice as wide as shell 15 is when closed. One or more retractable and/or removable legs 32 are provided on top part 15B. Legs 32 may be extended to support top part 15B in the open position shown best in FIG. 5B. For added stability, retractable and/or removable legs 33 may be provided to support bottom part 15A, as shown in FIGS. 5A-5B and 6A-6C.

A tent 34 is attached to shell 15 and may be contained within shell 15 when shell 15 is closed. As shown in FIG. 5A, tent 34 may optionally extend behind the rear end 14B of trailer 10 to cover an area 35. In some embodiments, the platform formed when shell 15 is opened serves as a sleeping area and area 35 serves as a living area.

Work Surface

Figure 6A:
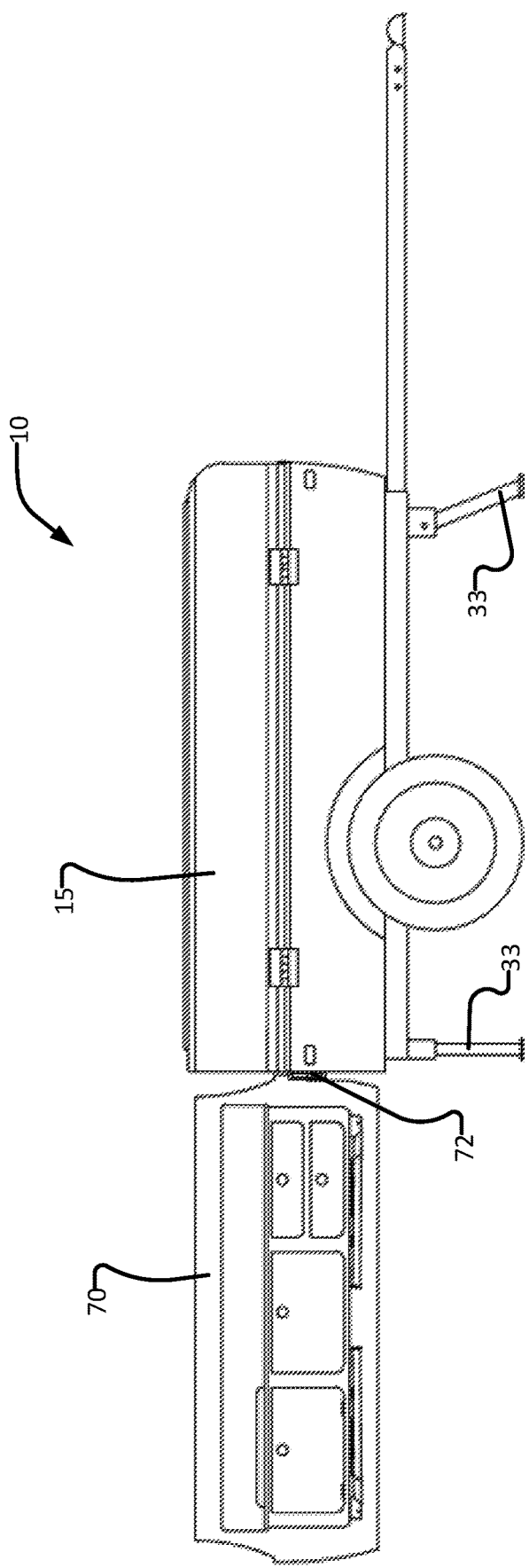
FIG. 6A is a side elevation view of a trailer with an attached work surface, according to an example embodiment of the invention.
Figure 6B:
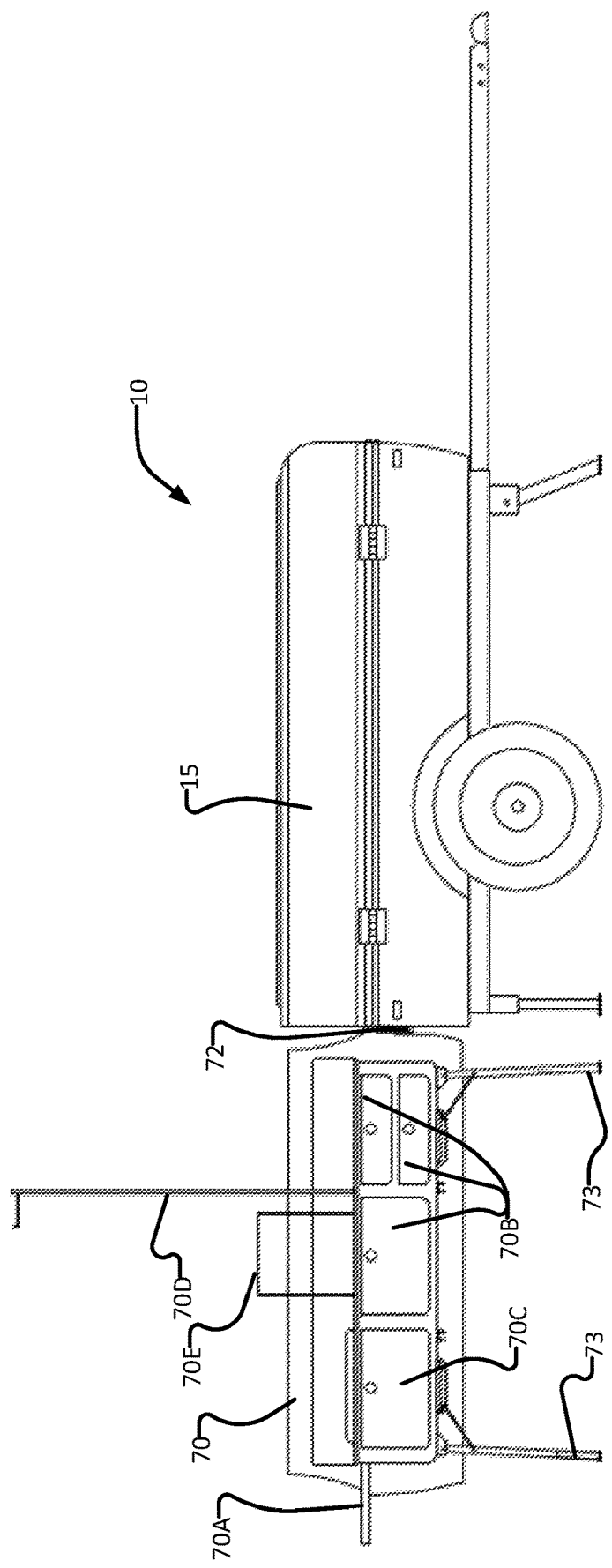
FIG. 6B is a side elevation view of the trailer shown in FIG. 6A with legs on the work surface extended.
Figure 6C:
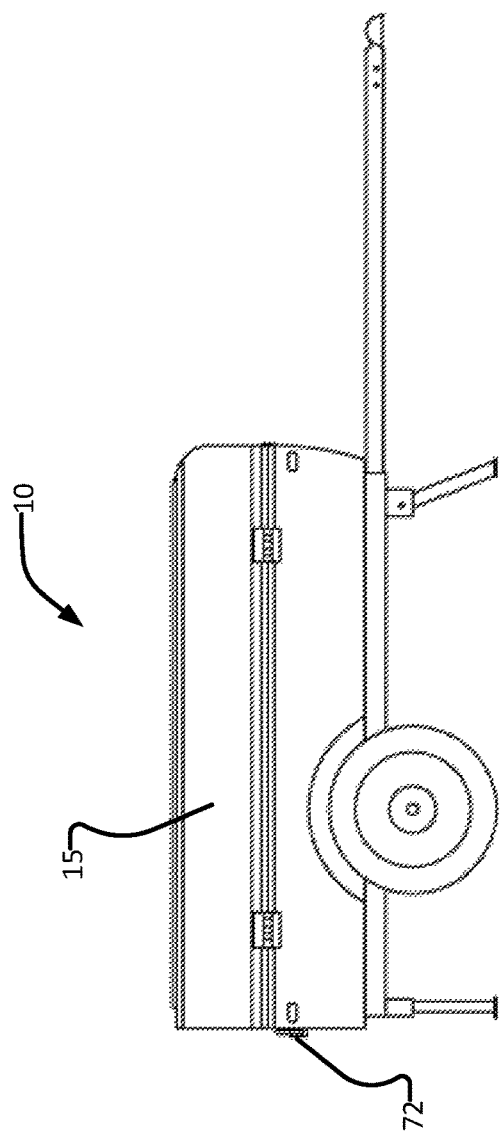
FIG. 6C is a side elevation view of the trailer shown in FIG. 6A with the work surface detached from the trailer.
Figure 6C:
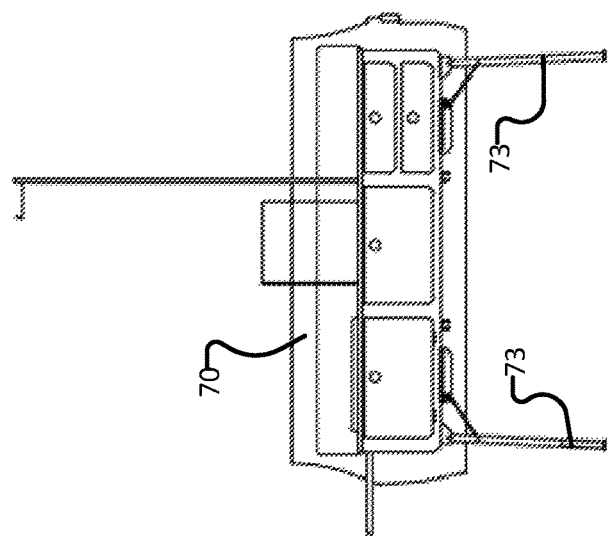

Trailer 10 may include a tailgate that provides a swing out and/or removable work surface. A work surface may be provided together with some or all of the other features described herein or in a trailer which lacks those features. FIGS. 6A through 6C show a trailer 10 which includes a swing out work station 70 comprising a work surface. In this example embodiment, work station 70 provides a food preparation or kitchen space.

Work station 70 is hinged on one side to shell 15 by a hinge 72. Work station 70 may be pivoted around hinge 72 until it projects rearwardly from trailer 15. One or more detachable and/or retractable legs 73 (as shown in FIG. 6B) may be provided to support the end of work station 70 away from hinge 72.

Work station 70 may optionally include (as shown in FIG. 6B) features such as:
a garbage bag holder 70A;
one or more drawers, cupboards, or other storage compartments 70B;
a gas burner 70C;
an elevated support 70D for a light; and
a utensil rack 70E.

In a trailer of the type shown in FIGS. 5A and 5B, work station 70 may be located in area 35 when it is deployed.

Work station 70 is optionally detachable from trailer 10, as shown in FIG. 6C. For example, hinge 72 may be configured to allow work station 70 to be lifted off of or uncoupled from trailer 10, or hinge 72 may itself be detachable from shell 15 and/or work station 70. Providing a detachable work station 70 allows work station 70 to be moved to an alternative location outside of area 35 where cooking smells can more easily dissipate. A detachable work station 70 may be equipped with legs 73 that enable the work station 70 to be free standing. In embodiments where work station 70 is detachable, wiring to tail lights in the tailgate may be unplugged to allow work station 70 to be removed from trailer body 14, then plugged back in when work station 70 is reattached to trailer body 14.

Trailer body 14 may be sealed to block ingress of water around edges of work station 70. In an example embodiment, shown in FIG. 6D, trailer body 14 is formed to provide a recess 80 dimensioned to receive work station 70. A flange 82 may be provided at an inner end of the recess. A seal 84 may be provided to seal between flange 82 and work station 70.

Interpretation of Terms

Unless the context clearly requires otherwise, throughout the description and the claims:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a hinge, tent, axle, suspension, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A trailer comprising:
   a body having opposing front and rear ends;
   a tongue carrying a hitch, the tongue removably mounted to the front end of the body;
   wheels rotatably connected to the body;
   a stand located at the rear or front end of the body, the stand comprising a base coupled to the body by one or more mounting members, the base configured to contact a generally horizontal support surface under the trailer at three or more locations surrounding a base area and to stably support the body in a storage configuration wherein the body is in a generally vertical orientation and a center of gravity of the body is located directly above the base area;
   wherein the base is coupled to the mounting members by one or more hinges which allow pivotal motion of the base relative to the mounting members about an axis that extends transversely relative to the body, the hinges operable to provide a fulcrum for tipping the body from a normal configuration in which the body is generally horizontal into the storage configuration;
   wherein the center of gravity follows an arc as the body is tipped from the normal configuration into the storage configuration, the base includes a stop which engages to stop rotation of the one or more hinges at a stop angle wherein the center of gravity of the body is below an apex of the arc when the stop is engaged.

2. The trailer according to claim 1 wherein the mounting part is L-shaped and the stop is provided by one arm of the L-shaped mounting member that engages the base when the one or more hinges are rotated to the stop angle.

3. The trailer according to claim 1 wherein the stand comprises a cradle for receiving the front or rear end of the body.

4. The trailer according to claim 1 wherein the stand comprises a locking mechanism operable to prevent pivoting of the one or more hinges.

5. The trailer according to claim 4 wherein the locking mechanism comprises a pin removably insertable in an aperture passing through the mounting member and a part attached to the base.

6. The trailer according to claim 1 wherein the one or more mounting members are removably coupled to the body.

7. The trailer according to claim 1 wherein the trailer body comprises a shell comprising a bottom part and a top part hingedly coupled to the bottom part.

8. The trailer according to claim 1 comprising a tailgate that provides a swing out work station removably attached to the body.

9. The trailer according to claim 8 wherein the workstation is coupled to the body by a hinge configured to allow the work station to be lifted off of the hinge.

10. The trailer according to claim 8 wherein the work station comprises legs which allow the work station to be free standing.

11. A trailer comprising:
a body having opposing front and rear ends;
a tongue carrying a hitch, the tongue removably mounted to the front end of the body;
wheels rotatably connected to the body;
a stand located at the rear or front end of the body, the stand comprising a base coupled to the body by one or more mounting members, the base configured to contact a generally horizontal support surface under the trailer at three or more locations surrounding a base area and to stably support the body in a storage configuration wherein the body is in a generally vertical orientation and a center of gravity of the body is located directly above the base area;
wherein the base is coupled to the mounting members by one or more hinges which allow pivotal motion of the base relative to the mounting members about an axis that extends transversely relative to the body, the hinges operable to provide a fulcrum for tipping the body from a normal configuration in which the body is generally horizontal into the storage configuration;
wherein the stand comprises first and second parts that each comprise an elongated member that provides a part of the base pivotally mounted to a corresponding one of the mounting members, each of the mounting members comprising a stop member that engages the corresponding one of the elongated members when the body is in the storage configuration.

12. The trailer according to claim 11 wherein lengths of the elongated members from the one or more hinges to ends of the elongated members distal from the body are such that a horizontal distance between the body and the ends of the elongated members is 6 inches (about 15 cm) or less when the body is in the storage configuration.

13. A trailer comprising:
a body having opposing front and rear ends;
a tongue carrying a hitch, the tongue removably mounted to the front end of the body;
wheels rotatably connected to the body;
a stand located at the rear or front end of the body, the stand comprising a base coupled to the body by one or more mounting members, the base configured to contact a generally horizontal support surface under the trailer at three or more locations surrounding a base area and to stably support the body in a storage configuration wherein the body is in a generally vertical orientation and a center of gravity of the body is located directly above the base area;
wherein the base is coupled to the mounting members by one or more hinges which allow pivotal motion of the base relative to the mounting members about an axis that extends transversely relative to the body, the hinges operable to provide a fulcrum for tipping the body from a normal configuration in which the body is generally horizontal into the storage configuration;
wherein the one or more mounting members are removably coupled to the body;
wherein the mounting members comprise one or more projections that are slidably engageable into one or more corresponding cavities provided on the body.

14. The trailer according to claim 13 wherein the body comprises a frame and the one or more corresponding cavities are located in the frame.

15. A trailer comprising:
a body having opposing front and rear ends;
a tongue carrying a hitch, the tongue removably mounted to the front end of the body;
wheels rotatably connected to the body;
a stand located at the rear or front end of the body, the stand comprising a base coupled to the body by one or more mounting members, the base configured to contact a generally horizontal support surface under the trailer at three or more locations surrounding a base area and to stably support the body in a storage configuration wherein the body is in a generally vertical orientation and a center of gravity of the body is located directly above the base area;
a work station removably attached to the body, the work station extendable in a longitudinal direction away from the body;
wherein the base is coupled to the mounting members by one or more hinges which allow pivotal motion of the base relative to the mounting members about an axis that extends transversely relative to the body, the hinges operable to provide a fulcrum for tipping the body from a normal configuration in which the body is generally horizontal into the storage configuration;
wherein the trailer body comprises a shell comprising a bottom part and a top part hingedly coupled to the bottom part.

16. A trailer comprising:
a body having opposing front and rear ends;
a tongue carrying a hitch, the tongue removably mounted to the front end of the body;
wheels rotatably connected to the body;
a stand located at the rear or front end of the body, the stand comprising a base coupled to the body by one or more mounting members, the base configured to contact a generally horizontal support surface under the trailer at three or more locations surrounding a base area and to stably support the body in a storage configuration wherein the body is in a generally vertical orientation and a center of gravity of the body is located directly above the base area;
wherein the base is connected to the one or more mounting members by a curved member wherein the curved member is located to contact the support surface when the body is tipped toward the end of the body on which the stand is located and the curved member is configured to serve as a fulcrum for tipping the body from a normal configuration in which the body is generally horizontal into the storage configuration;
wherein the center of gravity follows an arc as the body is tipped from the normal configuration into the storage configuration and, in the storage configuration the base supports the body in a position such that center of gravity of the body is below an apex of the arc.

17. The trailer according to claim 16 wherein the stand comprises first and second parts that are respectively detachably coupled to the body at locations near first and second sides of the body.

18. The trailer according to claim 16 wherein the trailer has a weight in the range of 500 pounds to 1000 pounds.

19. A method for storing a trailer, the method comprising:
coupling a stand one end of a body of the trailer, the stand comprising a base and a mounting part coupled to the body, the mounting part connected to the base by one of a hinge and a curved member; and
tilting the body from a horizontal position to a stable upright storage position about a fulcrum provided by the hinge or the curved member until the body reaches the storage position wherein a center of gravity of the body is located directly above the base when the body is in the upright storage position;

wherein the center of gravity follows an arc as the body is tipped toward the storage configuration and, in the storage configuration the base supports the body in a position such that center of gravity of the body is below an apex of the arc.

20. The method according to claim 19 comprising removably attaching the stand to the body of the trailer prior to tilting the body to the stable upright storage position.

\* \* \* \* \*